No. 784,648.

Patented March 14, 1905.

UNITED STATES PATENT OFFICE.

GEORGE C. WORTHINGTON, OF ELYRIA, OHIO.

PROCESS OF MAKING RUBBER-CORED GOLF-BALLS.

SPECIFICATION forming part of Letters Patent No. 784,648, dated March 14, 1905.

Application filed April 7, 1904. Serial No. 202,001.

*To all whom it may concern:*

Be it known that I, GEORGE C. WORTHINGTON, a citizen of the United States, residing at Elyria, in the county of Lorain and State of Ohio, have invented a certain new and useful Improvement in Processes of Making Rubber-Cored Golf-Balls, of which the following is a full, clear, and exact description, reference being had to the accompanying drawing.

The kind of golf-balls which are in almost universal use are the kind which are known as "rubber-cored" balls. They have a wound rubber core and a gutta-percha shell or cover, and on the outer surface of this cover are markings of some approved design, the so-called "bramble" marking being most generally used. In the method of manufacturing such golf-balls heretofore employed the core is first wound. Then this core is enveloped by a piece or pieces of gutta-percha rendered plastic and cohesive by heat. The ball is completed by compression in a two-part mold, in the surface of which the desired marking is cut. The surplus gutta-percha, which is always used, is squeezed out between the halves of the mold in an annular fin. The mold reduces the ball to the proper size; but in doing so it compresses the core more or less. The ball is allowed to remain in the mold until the cover is hard enough to resist the outward strain of the compressed core. Then it is removed and the fin referred to is cut off. The covers of balls constructed in this manner are disposed to crack in use. I do not think I exaggerate in saying that approximately twenty per cent. of such covers do crack in actual use, thereby in most cases rendering the balls useless. This tendency to crack is, in my opinion, due partly to the continuous outward strain upon the cover of the compressed core, partly to the strains in the gutta-percha cover itself, and partly to the weakening of the cover by cutting off the relatively large fin formed thereon.

In making balls according to my invention I proceed in the usual way in forming the core and putting on the cover; but the two-part mold employed to shape and compress the cover is preferably of slightly larger diameter than the desired ball—say one thirty-second of an inch—and it is smooth—that is to say, does not have the markings which are to appear on the surface of the ball. The ball is allowed to cool sufficiently to set in this mold, when it is removed and the fin cut off. Then the ball is again heated enough to permit the cover to yield slightly to the internal pressure of the core, but not to render it materially compressible by a mold, although its surface must be plastic. This heating may be effected by shaking the ball in a wire basket over a source of heat; but any method may be employed. Then the ball in this condition is placed in a mold of the desired size having the desired markings and is compressed therein. The core is not again compressed, or at least not to any injurious extent; but the surface markings are applied. The surplus gutta-percha is squeezed out between the mold-halves, thereby reducing the ball to the proper size. When the surface of the cover is "set," the ball is removed and the fin cut off. Balls so constructed are practically uncrackable in use.

Having described my invention, I claim—

1. The process of making rubber-cored golf-balls, which consists in covering a compressible core with gutta-percha in a plastic, cohesive condition; in compressing and shaping said ball; in allowing the cover to set while subject to pressure; in reheating the cover sufficiently to render it slightly yielding to the outward pressure of the compressed core and plastic on its surface; in again compressing and shaping the ball, reducing its diameter and applying the desired surface markings thereto; and finally in cutting off the fin produced thereon during this last operation.

2. The process of making golf-balls, which consists in covering a wound rubber core with gutta-percha in a plastic, cohesive condition; in forming the ball by pressure into a smooth sphere of slightly larger diameter than the finished ball is to be; in allowing the same to cool and set while subject to pressure; in trimming off the adhering fin; in reheating this cover slightly so that it is slightly yielding to the outward pressure of the compressed core and is elastic on its surface; in forming said ball by pressure into a sphere of the desired diameter and having the desired surface markings; and in finally trimming off whatever fin remains attached to the ball.

In testimony whereof I hereunto affix my signature in the presence of two witnesses.

GEORGE C. WORTHINGTON.

Witnesses:
P. S. WILLIAMS,
S. B. LEONARD.